United States Patent [19]

Bissell

[11] 4,413,529

[45] Nov. 8, 1983

[54] ADJUSTABLY KEYED PRESSURE GAUGE CONSTRUCTION

[75] Inventor: Robert D. Bissell, Orange, Conn.

[73] Assignee: Dresser Industries, Inc., Dallas, Tex.

[21] Appl. No.: 303,247

[22] Filed: Sep. 17, 1981

[51] Int. Cl.³ .......................... G01L 19/00; G01L 7/04
[52] U.S. Cl. ........................................ 73/756; 73/741;
  73/431; 73/740; 116/305; 403/14; 248/27.1
[58] Field of Search ................ 73/740, 741, 742, 743,
  73/756, 431; 285/93, DIG. 16; 403/13, 14;
  116/304, 305, 306, 309; 169/75; 248/544, DIG.
  4, 27.1

[56] References Cited

U.S. PATENT DOCUMENTS

| 1,922,616 | 8/1933 | Chisolm | 73/740 |
| 3,010,520 | 11/1961 | Seaberg | 169/75 X |
| 3,463,517 | 8/1969 | Courtot et al. | 285/93 |
| 3,952,598 | 4/1976 | Ferguson et al. | 73/415 |
| 4,046,387 | 9/1977 | Lee | 285/93 X |
| 4,161,888 | 7/1979 | Bissell | 73/740 |
| 4,296,949 | 10/1981 | Muetterties | 285/93 X |
| 4,384,736 | 5/1983 | Hartung | 285/93 |

Primary Examiner—Herbert Goldstein
Assistant Examiner—Tom Noland
Attorney, Agent, or Firm—Daniel Rubin

[57] ABSTRACT

A pressure gauge having a rotatably secured Bourdon tube, and a dial plate arcuately displaceable for effecting zero calibration of the gauge includes a rotationally presettable key for registered placement within a key-slotted receptacle in which the gauge is to be utilized. Keying is provided by a simulated Y-shaped washer mounted in an annular groove on the gauge stem and arcuately secured post-calibration at a predetermined angular setting from a reference point on the gauge dial.

6 Claims, 3 Drawing Figures

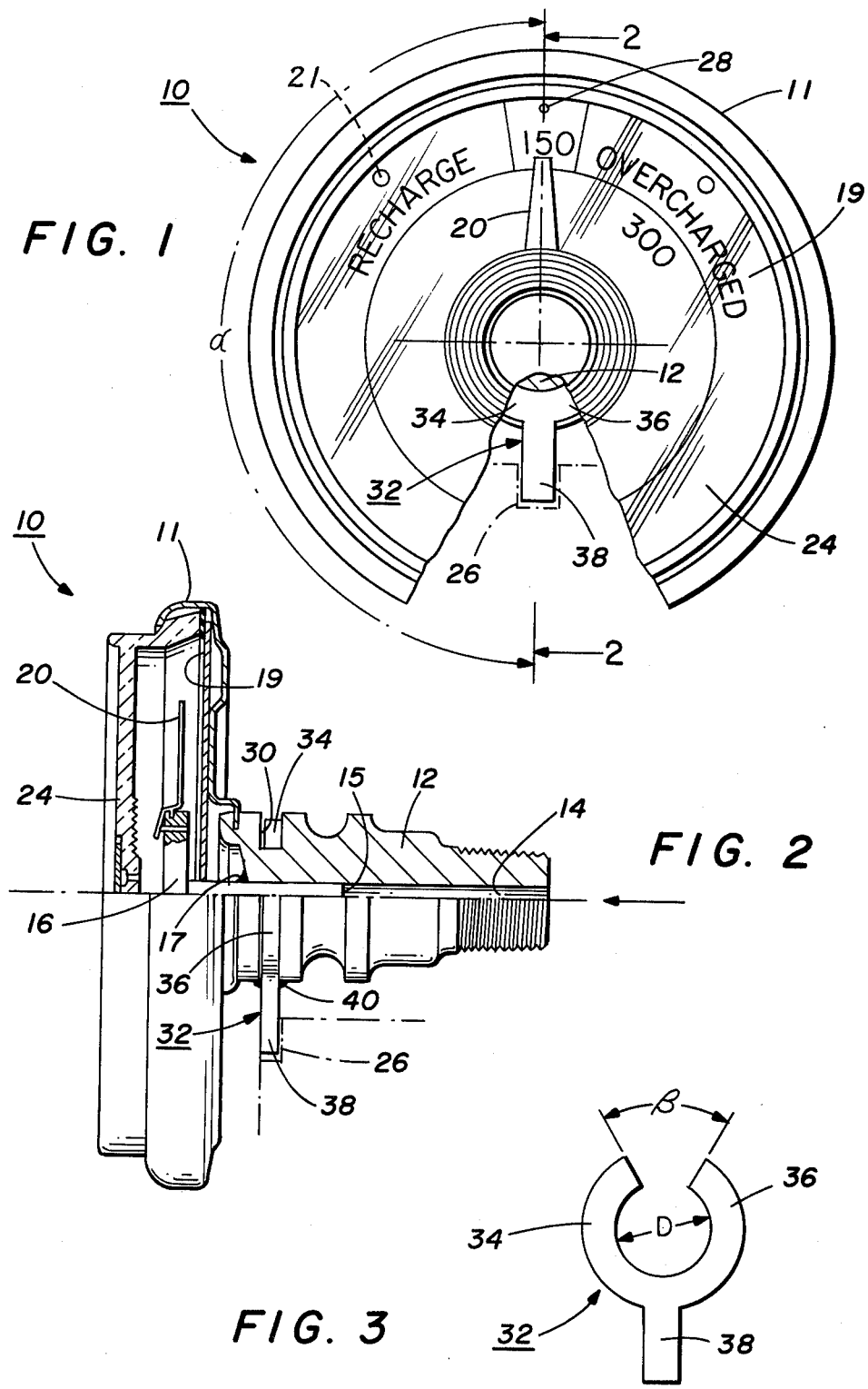

ADJUSTABLY KEYED PRESSURE GAUGE CONSTRUCTION

TECHNICAL FIELD

The technical field to which the invention pertains comprises the art of measuring and testing as related to fluid pressure gauges.

BACKGROUND OF THE INVENION

Pressure gauges enjoy very extensive commercial and industrial and are consequently regarded as high production items. Because of such wide use, they are supplied by a plurality of manufacturers and sold in very price conscious competition. Each manufacturer instinctively strives to reduce product costs and improvements, however marginal, which reduce labor and/or materials that can contribute to cost savings in the end product.

Commonly affording pressure sensitivity in a pressure gauge is a Bourdon tube of a pressure-tight construction having a free end displaceably movable in response to pressure changes supplied at its inlet. To translate tube movement into values of pressure, a pointer is connected to the free end of the Bourdon tube which then moves with the tube relative to a calibrated dial plate. For insuring readout accuracy, provision is usually made in the course of assembly, for adjustably positioning the pointer or dial plate so that they coincide at the zero position of the dial.

In a conventional construction, the inlet end of the Bourdon tube is secured to either the casing or the stem, while the dial plate can be arcuately displaced relative to the pointer to effect the zero adjustment. Such construction is most suitable where ultimate mounting of the gauge affords flexibility in orientation for convenient dial viewing in-place on the equipment. In some instances, however, such flexibility is lacking as, for example, where the gauge casing is required to be keyed to the equipment in a registered orientation as is fairly common for those gauges installed on fire extinguishers. It can be readily appreciated that in constructions of this type, i. e. where keyed registration is required, it is not possible to pre-key the gauge prior to zero calibration if indeed orientation of the displaceable dial plate is to be maintained with respect to the registered setting afforded by the key. One approach toward resolving this problem has been to utilize an unsecured Bourdon tube supporting the pointer such that the pointer instead of the dial plate can be arcuately displaced as disclosed, for example, in U.S. Pat. No. 3,952,598. Despite recognition of the problem of keying the gauge with a secured Bourdon tube, a ready solution thereto has not heretofore been known.

SUMMARY OF THE INVENTION

The invention relates to pressure gauges and particularly to small, low cost gauges suitable for use on fire extinguishers or the like. More specifically, the invention relates to a pressure gauge of a fixed Bourdon tube construction adapted for registered placement via a keyed interfit on a fire extinguisher with which the gauge is to be utilized.

The foregoing is achieved in accordance with the invention by means of an annular groove machined in the metal socket of the gauge rearward of the case and adapted to receive a simulated Y-shaped brass washer free for arcuate displacement thereon. After calibration of the gauge is completed by displacing the zero position of the dial plate until it coincides with the pointer position, the washer is mounted onto the groove and its index tab then rotated to the predetermined angular setting necessary for a proper key fit with the contemplated installation. A sealant such as an anaerobic compound marketed under the trademark Loctite is then added to the washer-socket joint in order to secure the washer in the set position. Thereafter, the gauge can be utilized in a conventional manner.

It is therefore an object of the invention to provide a novel gauge construction for a pressure gauge requiring key registered installation.

It is a further object of the invention to effect the previous object in a novel and inexpensive manner for an otherwise comparably low cost gauge construction.

BRIEF DESCRIPTION OF THE DRAWINGS

FIG. 1 is a partially fragmented front view of a gauge construction utilizing the invention hereof;

FIG. 2 is a sectional view taken substantially along the lines 2—2 of FIG. 1; and FIG. 3 is a front elevation view of the washer key hereof.

Referring now to the drawings, the gauge construction hereof comprises a more or less cup-shaped casing 10 having a peripheral flange 11 and a metal socket stem 12 extending laterally rearward of the casing. Stem 12 includes a central tubular passage 14 in which the inlet end 15 of a multi-coiled Bourdon tube 16 is rotationally secured thereat by means of solder 17. Supported against the inside face of the casing is a dial plate 19 which for purposes hereof can be arcuately displaced to effect zero calibration of the uncharged gauge by aligning the tip of pointer 20 with the zero position graduation 21. A transparent crystal 24 supported on the front side of the casing permits ready viewing of the pointer position relative to the graduations imprinted on the dial plate 19. In the gauge embodiment being described, stem 12 is of a construction adapted for plug-in rather than threaded installation, while the center of an equipment receiving key slot 26, shown in phantom in FIG. 1, represents a registration angle $\alpha$ of 180 degrees from a reference point 28 on the dial plate.

Maintaining predetermined angle $\alpha$ is, of course, essential to eventual use of the gauge, and in accordance herewith is achieved after completing the zero setting displacement of dial plate 19 with respect to pointer 20 before crystal 24 is mounted in place. To effect proper keying, socket stem 12 includes a machined annular slot 30 positioned rearward of casing 10 and adapted to receive a simulated Y-shaped brass washer 32 for loose rotational movement thereabout. Washer 32, as best seen in FIG. 3, is comprised of arcuate side legs 34 and 36 of inside diameter D for receipt on slot 30, and separated at their ends by an angle $\beta$ sufficient to enable installation thereon. Joined integral with the side legs is an intermediate index leg or tab 38 extending radially outward therefrom and constituting the key registration element for placement into equipment slot 26.

Washer 32 is initially assembled loosely onto groove 30 generally after zero calibration of the gauge has been completed as aforesaid, and then rotated until positioned at the location corresponding to the angle $\alpha$ with respect to reference indicia mark 28. A sealant 40 is then placed so as to secure the position of washer 32 thereat, thereby completing the gauge assembly and enabling its use with the registered installation for which use is contemplated.

By the above description there is disclosed a novel construction of a pressure gauge able to readily accommodate dial displacement zero calibration with a predetermined registration requirement for the use with which the gauge is contemplated. The construction is simple and inexpensive so as not to detract from the otherwise comparatively low cost of the gauge, and yet is effective in achieving the intended purposes thereof in a reliable manner.

Since many changes could be made in the above construction, and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a pressure gauge including a casing, a Bourdon tube rotationally secured relative to said casing, a pointer operably connected to said Bourdon tube, a dial plate arcuately displaceable for zero calibration setting relative to said pointer and a reference indicia on said dial plate, key means supported on said gauge and adjustably set at a predetermined angular displacement from said reference indicia on the post-calibration setting of said dial plate.

2. In a pressure gauge according to claim 1 including a stem extending laterally rearward from said casing, support means on said stem for supporting said key means and means securing said key means on said stem at said angular displacement setting.

3. In a pressure gauge according to claim 2 in which said support means comprises a groove extending transversely in the periphery of said stem.

4. In a pressure gauge according to claim 3 in which said groove is annular and said key means is of a simulated Y-shape adapted to be received in said groove.

5. In the method of manufacturing a pressure gauge including a casing, a Bourdon tube rotationally secured relative to said casing, a pointer operably connected to said Bourdon tube, a dial plate arcuately displaceable for zero calibration setting relative to said pointer and a reference indicia on said dial plate, the step of adjustably setting key means on said gauge at a predetermined angular displacement from the reference indicia on the post-calibration setting of said dial plate.

6. In the method according to claim 5 including the added step of securing the key means to said gauge at the adjusted setting of the preceding step.

* * * * *